United States Patent [19]

Gunn

[11] Patent Number: 4,965,877

[45] Date of Patent: Oct. 23, 1990

[54] POWER SUPPLY SYSTEM

[76] Inventor: Dennis R. Gunn, Shiratori 2-5-13, Asou-Ku, Kawasaki-Shi, Kanagawa-ken, Japan, 215

[21] Appl. No.: 336,651

[22] Filed: Apr. 7, 1989

[51] Int. Cl.[5] .............................................. H02M 1/00

[52] U.S. Cl. .................................... 363/146; 439/502; 439/505

[58] Field of Search ................ 363/146, 147; 439/502, 439/505, 506; 84/454, DIG. 25

[56] References Cited

U.S. PATENT DOCUMENTS

| | | | |
|---|---|---|---|
| 1,734,432 | 11/1929 | Goudy | 439/505 |
| 4,609,240 | 9/1986 | Pistor | 439/259 |
| 3,761,8621 | 9/1973 | Spiteri | 439/505 |

FOREIGN PATENT DOCUMENTS

| | | | |
|---|---|---|---|
| 0188372 | 10/1984 | Japan | 363/146 |

OTHER PUBLICATIONS

Electrical Manufacturing, Apr. 1959, p. 16.

*Primary Examiner*—Peter S. Wong

[57] ABSTRACT

In a system for supplying DC power to musical effect units a cord is provided having descrete jacks at each end for supplying power to and conducting a signal from or to the effect unit. The jacks at the respective ends are connected by short lengths of flexible cable which allow them to be plugged into receptacles whose spacings may vary. In the power supply unit according to the invention a male jack, by which the unit may be suspended from a wall outlet or the quarter inch female jack in the face of the amp, is connected to the main body of the unit by means of a flexible sheet of material which reduces the stress on the respective jacks. The AC/DC conversion unit according to the system of the invention is advantageously disposed in the vicinity of the other units such as the amp which require AC power. Thus by consolidating the power supply cord with the signal conducting cord the number of cords extending into the performance area can be advantageously reduced.

13 Claims, 5 Drawing Sheets

POWER SUPPLY SYSTEM

The present invention relates generally to a power supply system for supplying DC power to audio devices. More specifically the present invention relates to a system designed to reduce the number of cables which are required to be connected with signal processing devices or the like disposed between the between an electrical instrument and an amplifier which require a low voltage DC power source.

BACKGROUND OF THE INVENTION

In the field of electric musical instruments such as electric guitars, basses and keyboards etc. small processing units, commonly referred to as effect pedals, are popular. They are designed to be disposed on the floor near the feet of the musician remote from the amplifier so that they may be easily switched on and off by means of foot switches generally located on their upper surfaces. Usually this type of pedal operates on 9 or 18 volts.

Commonly the power supply for these devices consists of one or more 9 volt batteries. As is well known batteries have a limited charge life. It therefore becomes frequently necessary to replace or recharge the batteries of effects which consume a large amount of power. This incurs a considerable expense and/or consumption of time.

The well known solution to the above problem is to employ an AC adapter which converts the relatively high voltage AC power commonly available from household wall outlets into the DC voltage required for the effect pedal.

The latter solution is commonly practiced but raises new problems of its own. The problems encountered with the AC adapter commonly employed in the prior art are related to the cords associated therewith. Specifically a shielded cable is required between the amplifier and the effect to transmit the audio signal output of the instrument to the amplifier. When an AC adapter is used for the effect pedal an additional cord is required to connect the effect pedal to the AC adapter. This generally adds to the clutter of cables in the area in which the musician is performing.

Compounding the above disadvantage is the fact that the most commonly used type of AC adapter comprises a relatively short coaxial cord for conducting the DC voltage output of the main body of the adapter unit to a female DC-in jack of the effect, and the main body of the adapter unit comprises rigid prongs protruding directly therefrom and designed to be inserted into a standard AC wall outlet. The result of this is that in actual practice there usually ends up being a coaxial AC cable extending midway into the performance space at which point it connects with the relatively bulky AC adapter and the path of power supply continues through the thinner DC conducting cables to the effect pedal. The preponderance of cables in this situation is not only unattractive but poses the hazard of tripping the musician and possible electric shock if the AC cables become worn or broken from being stepped on.

A further problem is that induction from the AC cables can cause noise in the form of sixty cycle hum in the audio cables when they are arranged in close proximity. Furthermore the need to arrange and transport the extra cables for the AC power is troublesome and adds to the set-up time required to prepare for a performance.

Thus the need for a convenient power supply system appropriate for use with DC powered effect devices is felt in the art of electric musical instruments.

It will be noted that in the art of electronics in general, composite cords for conducting signals and DC power are known. However in the known devices the terminal ends of the cables are almost invariably provided with rigid multi pin jacks in which the arrangement of pins is rigidly fixed in a pattern arbitrarily determined according to the make or model of the device. It will be further noted that in the art of musical instruments, the signal jacks are highly standardized so as to allow virtually any instrument to used with virtually any amp, and therefore from a practical standpoint departures from the established conventions are unacceptably inconvenient.

SUMMARY OF THE INVENTION

In view of the above problems in the prior art it is the object of a system according to the present invention to reduce the number of cables which are required to be arranged in the vicinity of a DC powered audio device positioned remotely from an audio amplification unit.

It is a further aim of the invention to provide a convenient power supply system which reduces the set up time required for setting up the audio equipment and remote processing units prior to a performance.

It a still further object of the invention to provide a power supply system which is fully compatable with conventional DC powered audio processing units of the type commonly referred to as effect pedals and requires no modification thereto in order to operate.

In order to achieve the above objects and others a power supply system according to the instant invention comprises an insulated, electromagnetically shielded cable having not less than three mutually distinct conducting elements. The shielding of the cable my comprise one of the conducting elements and may be connected to ground. At least one of the remaining conducting elements is disposed within the shielding and comprises the "hot lead" for conducting the audio signal and the remaining conducting element is forms the hot lead of for power source.

In the preferred embodiment each end of the cable is provided with a male quarter inch phone jack for conducting audio signals and a male standard power supply jack for conducting DC. The end portions of the cable, according to the preferred embodiment of the invention, comprise a relatively short section on which one of the jacks is connected, arranged such that the respective jacks of each of the respective end portions can be inserted into recepticles which are separated by a distance which varies in the range of a few centimeters.

According to another aspect of the invention the DC power source comprises a female quarter inch phone jack for receiving an audio input and a female DC power jack for outputting DC power.

In one embodiment of the invention the female audio input jack and the female DC output jack are provided directly on the amplifier.

According to another embodiment of the invention the DC power source comprises a female DC output jack, an audio input jack, an audio output jack and a coaxial cable for connection to the AC power source. The audio output jack may be a male jack rigidly or semi-rigidly mounted so as to protrude from a rear face of the DC power source.

Alternatively the main body of the AC/DC converter unit may be formed, essentially as is common in the prior art, with a pair of prongs adapted to be received in a conventional AC wall outlet and a thin coaxial cord for conducting the DC power. In the latter configuration a female jack for receiving the male DC jack of the signal/power cable is provided integral to a unit comprising means for connection with the AC/DC power unit&. Simply put, the DC cable of the AC/DC converter unit may have a female jack provided at the end thereof for receiving the male jack of the power/-signal cable.

In one preferred configuration the female DC power outlet jack is provided on a unit comprising a male jack by which it can be semi-rigidly fixed onto the face of an audio amplifier or signal processing unit and a female jack for coupling the male jack of the signal power cable according to the invention to the audio input of the amplifier. In this manner the power and the signal coupling jacks at the amplifier side are maintained in a conveniently fixed location on the face of the amplifier when the signal/power cable is disconnected therefrom.

According to another aspect of the invention an improved mechanical coupling between the body of an electrical device, such as the AD/DC adapter according to the invention, and a female outlet, such as a conventional AC wall outlet or a female quarter inch phone jack, is provided. This is achieved by providing the male jack on a somewhat flexible sheet of material which is connected to the rear face of the AC unit. The effect of this is to provide a semi-flexible coupling between the body of the adapter unit and the wall outlet or amplifier jack by which it may be suspended.

In the above way, damage to the jack, due to the almost inevitable relative vibrations and shocks between the adapter body and the amplifier encountered during regular use, is avoided yet the position and orientation of the body of the unit remain relatively fixed.

Another effect of the semi-flexible coupling when it is provided between a phone jack and the AC/DC adapter unit body is to reduce the chances of the adapter unit becoming unintentionally disconnected during use due to vibration of the amplifier.

Still another advantage of the semi-flexible coupling is that the body of the AC adapter unit can hang essentially vertically, and therefore stably even if the face of the amplifier unit is curved or comprises a corner near the input jack such that the plane of the jack angles backwards.

Yet another advantage of the semi-rigid coupling according to the invention is that the male jack can be inserted into the female jack even if the female jack is provided in a recess as in some brands of amplifier.

IN THE DRAWINGS

In FIG. 1 an effect pedal of the most common configuration is depicted.

In FIG. 2 a preferred embodiment of a signal/power cable according to the invention is depicted.

In FIG. 3 an end of the cable of FIG. 2 is shown with the DC jack stored in a holder provided thereon.

In FIG. 4 the cable of FIG. 2 is depicted with the various layers of insulation and shielding exposed for explanational purposes.

In FIG. 5 an amplifier according to the an embodiment of the invention is depicted.

In FIG. 6 an embodiment of the invention employing the cable of FIG. 2 and the amplifier of FIG. 5 is depicted schematically.

In FIG. 7 a DC power supply and jack/terminal unit according to an embodiment of the invention is depicted.

In FIG. 8 a DC power supply unit substantially similar in all respects to the one shown in FIG. 7 except for the placement of the jacks on the surface thereof is depicted.

In FIGS. 9 and 10 DC power supplies and jack/terminal units according to other embodiments of the invention are depicted.

DETAILED DESCRIPTION OF EMBODIMENTS

Figure 1:
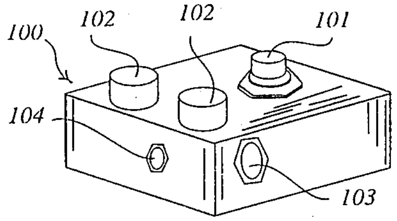

In FIG. 1 an effect pedal 100 of the most common configuration is depicted. The pedal 100 comprises a foot switch 101, effect adjustment knobs 102, an instrument signal input jack (not visible in FIG. 1) a signal output jack 103, and a DC input jack 104. In most effect pedals currently in use the power source is required to be nine volts. It will be noted that the distance separating the signal output jack and the DC input jack varies between models and makers.

Figure 2:
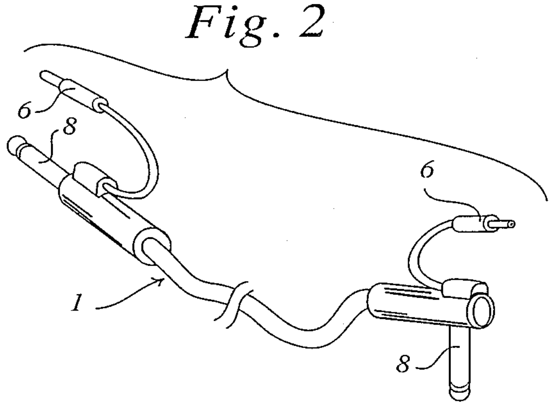
Figure 3:
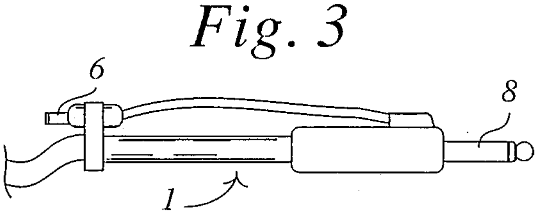
Figure 4:
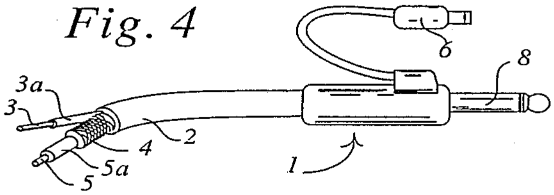

In FIGS. 2–4 a composite cable 1 according to the invention is depicted. The composite cable 1 is comprised of an electrically insulating sheath 2 within which are enclosed a first discrete insulated conductor cable 3 comprising an insulating sheath 3*a*, a braided ground/shield element 4 and a second discrete conductor element 5 comprising an insulating sheath 5*a* and arranged within the shielding element 4 so as to be shielded from electromagnetic flux thereby.

The first conductor cable 3 is connected at either end thereof, to the hot leads of a pair of jacks 6 of the type commonly used as the DC coupling for audio devices, provided at either end of the cable 1 via a short flexible insulated lead section 7 formed between the jacks 6 and the composite cable 1.

It will be noted that, as will be described later the cable 1 comprises a ground lead by which the effect is connected to ground through the power supply. Therefore the lead 7 may if desired comprise only a single conductor element connected to the hot lead 3 since the effect can be grounded through the shielding element of the cable.

Alternatively the cable 7 may comprise a pair of discrete conductor elements one of which is connected to ground and the other of which is connected to the hot lead 3.

The second descrete conductor cable 5 is connected at either end to the hot leads of a pair of quarter inch phone jacks 8 and the shielding element 4 is connected to the grounds of the jacks 8.

In the preferred embodiment a pair of snap recepticles 9 are provided on portions of the cable 1 to which the DC jacks may be attached when not in use.

Figure 5:
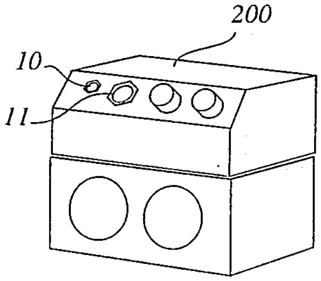
Figure 6:
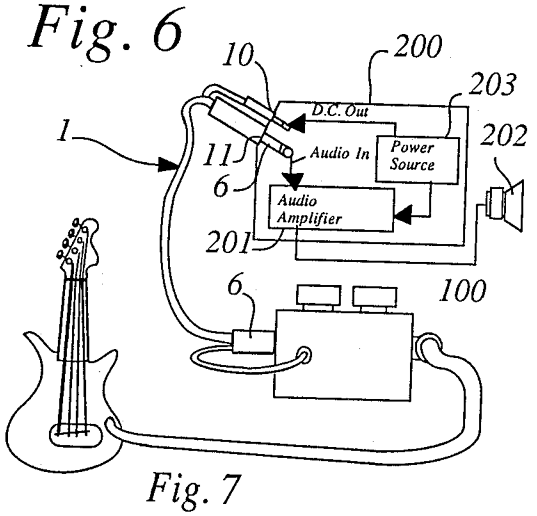

As depicted schematically in FIG. 5 in an embodiment of a system according to the invention an amplifier unit (also shown in FIG. 6) of otherwise conventional construction comprises a female DC power outlet 10 adjacent to the female audio input jack 11.

The jack 11 is connected to an amplification section 201 by which the signal is amplified and supplied to a speaker 202. The jack 10 is connected to an appropriate terminal of the power supply 203 of the amplifier to obtain the desired DC voltage for the effect 100.

It will be noted by those skilled in the art of audio amplifier construction that sources from which DC power may be tapped are usually abundant in the circuitry of conventional audio amplifiers and in the cases where no such tap is available usually a tap can be taken from the power transformer to provide the appropriate AC voltage which may be converted by a rectifier circuit in the conventionally known manner into a DC voltage to be supplied to the DC power output jack 10.

Figure 7:
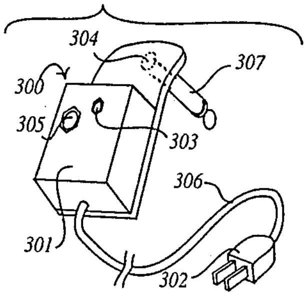

In FIG. 7 a power supply unit 300 according to the invention adapted to be used with prior art amplifiers comprising no DC output is depicted.

The power supply unit 300 comprises a male quarter inch phone jack 307 fixed to the main body 301 of the unit 300 by means of a sheet 304 of flexible material such as flexible plastic. In this manner an elastic coupling is formed between the body 301 and the jack 307.

Within the main body 301 is disposed an AC/DC conversion unit for converting AC power obtained by means of plug 302 into an appropriate DC voltage such as nine or eighteen volts appearing at jack 303.

The male jack 307 is connected to a female quarter inch phone jack 305 by means of flexible conducting elements (not shown) formed on or in the sheet 304.

In figure eight an AC/DC power supply unit substantially similar in all respects to the one shown in FIG. 7 except for the placement of the female jacks 303 and 305 is depicted in engagement with an amplifier 1000 whose input jack 1001 is disposed in a recess in the face thereof.

Figure 8:
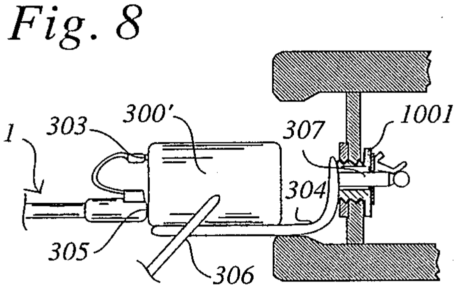

As can be appreciated from FIG. 8, in such an amplifier if the flexible section 304 were not provided, it would be impossible to insert the jack 307 into the jack 1001 of the amplifier 1000.

As will be appreciated with the disclosed configurations the units 300 and 300′ can hang neatly from the input jack of an amplifier and be connected to the courtesy plug of the amplifier or to the outlet from which the amplifier is drawing power. As will further be appreciated the unit 300 can be used to supply power to the effect pedal 100 via the cable 1 and thus the number of cables running into the performance area of the musician is advantageously reduced.

Figure 9:
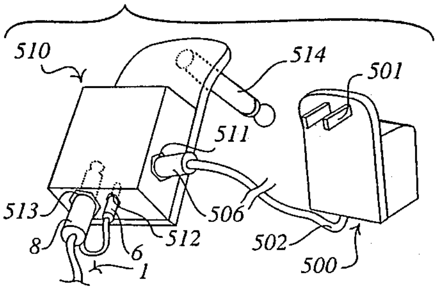

In FIG. 9 another embodiment of a DC power supply system according to the invention is depicted. In the system shown in FIG. 9 an AC/DC converter unit essentially similar in all respects to the variety well known in the prior art except for the provision of the flexible plastic sheet 304 as the mechanical coupling between the two prong AC plug 501 and the main body of the converter unit 500.

As in prior art devices the adapter unit comprises a coaxial conductor cable with a male jack at one end thereof.

The convertor unit converts AC current inputted thereto through the prongs 501 into an appropriate DC voltage output (such as nine or eighteen volts) at the male jack 506.

A coupling unit 510 is provided according to the FIG. 9 embodiment. The coupling unit 510 comprises a female jack 511 for receiving the male jack 506 a second female jack 512, whose hot lead is connected to the hot lead of the jack 511 for receiving the jack 6 of a cable 1 according the invention and a female jack 513 for receiving the jack 8 of the cord 1. A male jack 514, whose hot lead is connected to the hot lead of the female jack 513, is also provided on the coupling unit 510.

Thus the coupling unit 510 can hang from the face of an amplifier and serves to consolidate the interface between the power supply 500, the amplifier (not shown) and cable 1. Thus as in the above embodiments a tangle of cords extending into the performance area of the musician is avoided.

While the coupling unit according to the shown embodiment is designed to be a power supply, it will be noted that the principle of the unit suspended from the face of the amplifier, or other unit comprising a quarter inch phone jack, by means of a male jack formed on a flexible sheet may also be advantageously applied to a self contained signal processing unit such as an effect or even a radio transmitter or receiver of a wireless guitar type system.

It will be noted that in the FIG. 9 embodiment the unit 500 may be replaced by a conventional prior art AC/DC converter.

It will further be noted that in the FIG. 9 embodiment, as in the FIGS. 7 and 8 embodiments, the AC power can be conveniently obtained through the courtesy plug of the amplifier or through the outlet through which the amplifier is drawing power.

It will still further be noted that, although in the above embodiments the flexible plastic coupling is provided between the adapter bodies and the male jacks, embodiments in which the flexible coupling may be omitted may be conceived.

Figure 10:
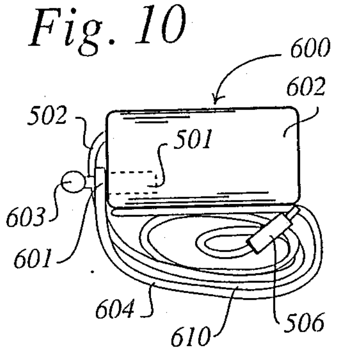

In FIG. 10 a AC/DC converter unit 600 essentially similar in function to that 500 is shown in a condition for storage. The unit 600 varies from the unit 500 only in that the flexible plastic section comprises a handle 603, and is longer than that 304 of the unit 500, and a female AC socket 601, wired to the prongs 501, is provided on the body 602.

The socket 601 is wired directly to the prongs 501 so that while the unit is plugged into a wall outlet the AC power from the wall outlet can be obtained therefrom.

As can be seen from FIG. 10 when the unit 600 is to be stored the DC cable 502 is coiled and the flexible plastic section can bend back upon itself so as to allow the plug 501 to be inserted into the socket 601. A space 610 is thus conveniently defined for receiving the coiled cable 502. A flexible tab or handle 603 serves to allow the plug to be easily removed manually from the socket 601 or from an AC outlet.

Although in the pictured embodiments the male jacks of the AC/DC conversion units are connected to the flexible sheet so as to protrude at a right angle thereto an embodiment is conceivable wherein the prongs or jacks protrude parallel to the plane of the flexible sheet.

It will be readily apparent from the above disclosure that invention may be embodied in various forms without departing from the spirit of the invention. Therefore the drawings and disclosure given above are intended as examples of the invention and that numerous embodiments are possible within the scope set out in the appended claims.

What I claim is:

1. In a DC power supply system for supplying power from a DC power source to a unit having an audio output jack and a DC input jack discrete from said audio output jack, a cord comprising:

a first insulated conducting element;

a second conducting element for electromagnetically shielding said first conducting element;

a third insulated conducting element, said third conducting element being provided for conducing DC current;

a first pair of jacks, said first pair of jacks being of a first form and being connected to opposite ends of said first insulated conducting element for conducting an audio signal; and a second pair of jacks, said second pair of jacks being discrete from, and of a different form than, said first pair of jacks for supplying DC power from said power source to said unit.

2. A coupling unit for forming an intermediate coupling between a cable having a male quarter inch phone jack and a unit housing having a female quarter inch phone jack comprising:

a main body whereon a female quarter inch phone jack is formed;

a sheet of flexible material, said sheet of flexible material being substantially supple and being connected to said main body, and a male quarter inch phone jack connected to said flexible sheet so as to be resiliently connected to said main body thereby.

3. An electrical appliance comprising:

a main body containing an electrical circuit;

a sheet of flexible material, said sheet of flexible material being substantially pliable and being connected to said main body; and a plurality of conducting prongs, said plurality of conducting prongs being connected to said sheet of flexible material so as to be resiliently connected to said main body thereby and said plurality of conducting prongs extending from said sheet of flexible material at a right angle thereto.

4. A cord as set out in claim 1 wherein said third insulated conducting element is disposed outside of the region enclosed by said shielding element for forming an electrical connection between respective hot leads of said second pair of jacks, said first conducting element forms the electrical connection between the hot leads of said first pair of jacks, and said third conducting element forms the electrical connection between hot leads of said second pair of jacks.

5. A cord as set out in claim 1 wherein said first pair of jacks are quarter inch phone jacks.

6. A coupling unit as set forth in claim 2 wherein said coupling unit comprises a second female jack of a configuration different from that of said female quarter inch phone jack for supplying DC power simultaneously to an audio signal received through said female quarter inch phone jack without interfering with or influencing said audio signal.

7. A coupling unit as set out in claim 6 wherein said unit comprises a DC power source for supplying DC power to said second female jack.

8. A coupling unit as set forth in claim 2 wherein said coupling unit comprises a female jack of a configuration different from that of said quarter inch phone jack, for receiving DC power.

9. A coupling unit as set forth in claim 8 wherein said coupling unit comprises a second female jack of a different configuration than that of said first female jack for supplying DC power received through said female jack for receiving DC power.

10. An electrical appliance as set forth in claim 3 wherein an AC/DC conversion circuit and a jack for outputting DC power is provided.

11. A cord as set forth in claim 4 wherein said first second and third conducting elements are enclosed within a common insulating sheath.

12. A cord as set forth in claim 1 wherein said first jacks are connected to said second jacks by flexible cables whose lengths are not less than one centimeter and not more than 20 centimeters.

13. A coupling unit for forming an intermediate coupling between a cable having a male quarter inch phone jack and a unit housing having a female quarter inch phone jack comprising:

a main body;

a female quarter inch phone jack, said quarter inch phone jack being formed on said main body for conducting an audio signal;

a male quarter inch phone jack, said quarter inch phone jack being connected to said main body for conducting a signal received through said female quarter inch phone jack to said unit housing; and a female DC output jack, said female DC output jack being formed so as to output DC power simultaneously to an audio signal received through said female quarter inch phone jack without substantial interference or influence on said audio signal.

* * * * *